United States Patent
Li et al.

(10) Patent No.: US 11,379,741 B2
(45) Date of Patent: Jul. 5, 2022

(54) METHOD, APPARATUS AND STORAGE MEDIUM FOR STAY POINT RECOGNITION AND PREDICTION MODEL TRAINING

(71) Applicant: BEIJING BAIDU NETCOM SCIENCE AND TECHNOLOGY CO., LTD., Beijing (CN)

(72) Inventors: Yanyan Li, Beijing (CN); Jianguo Duan, Beijing (CN); Hui Xiong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 373 days.

(21) Appl. No.: 16/823,214

(22) Filed: Mar. 18, 2020

(65) Prior Publication Data

US 2021/0042641 A1  Feb. 11, 2021

(30) Foreign Application Priority Data

Aug. 7, 2019  (CN) .......................... 201910725078.2

(51) Int. Cl.
  *G06N 5/04*   (2006.01)
  *H04W 4/029*  (2018.01)
  *G06N 20/00*  (2019.01)

(52) U.S. Cl.
  CPC .............. *G06N 5/04* (2013.01); *G06N 20/00* (2019.01); *H04W 4/029* (2018.02)

(58) Field of Classification Search
  CPC ......... G06N 5/04; G06N 20/00; H04W 4/029; G06F 16/9535; G01C 21/20; G08G 1/0129
  See application file for complete search history.

(56) References Cited

U.S. PATENT DOCUMENTS

| | | | | |
|---|---|---|---|---|
| 2010/0211308 A1* | 8/2010 | Zheng | .................... | G01C 21/20 |
| | | | | 707/E17.05 |
| 2010/0306249 A1* | 12/2010 | Hill | ..................... | G06F 16/9535 |
| | | | | 707/769 |

(Continued)

FOREIGN PATENT DOCUMENTS

| CN | 106203505 A | 12/2016 |
|---|---|---|
| CN | 106767835 A | 5/2017 |

(Continued)

OTHER PUBLICATIONS

First Office Action and Search report from CN app. No. 2019107252434, dated Aug. 4, 2020, with English translation from Global Dossier.

(Continued)

*Primary Examiner* — Joshua L Schwartz
(74) *Attorney, Agent, or Firm* — Ladas & Parry, LLP

(57) ABSTRACT

A method, an apparatus and a storage medium for stay point recognition and prediction model training are proposed. The method may include: for a to-be-recognized positioning point, obtaining respectively features of N predetermined dimensions for the to-be-recognized positioning point, N being a positive integer greater than one; generating a feature vector for the to-be-recognized positioning point according to the features obtained; determining whether the to-be-recognized positioning point is a stay point based on the feature vector, by using a prediction model obtained by pre-training. The technical solution may be applied to improve the accuracy and a recall rate of the stay point recognition.

18 Claims, 3 Drawing Sheets

(56) References Cited

U.S. PATENT DOCUMENTS

| | | | | |
|---|---|---|---|---|
| 2013/0130214 A1* | 5/2013 | Ohno | ............... | G08G 1/0129 |
| | | | | 434/236 |
| 2014/0310366 A1 | 10/2014 | Fu et al. | | |
| 2016/0021503 A1* | 1/2016 | Tapia | ............... | G01S 5/02 |
| | | | | 455/456.1 |
| 2016/0180232 A1 | 6/2016 | Tsubouchi et al. | | |
| 2016/0328661 A1* | 11/2016 | Reese | ............... | G06N 7/005 |
| 2017/0265030 A1 | 9/2017 | Jung | | |
| 2017/0300919 A1 | 10/2017 | Chen et al. | | |
| 2020/0042902 A1 | 2/2020 | Li et al. | | |
| 2020/0251184 A1* | 8/2020 | Washio | ............ | G01N 27/3278 |
| 2021/0044930 A1 | 2/2021 | Li et al. | | |

FOREIGN PATENT DOCUMENTS

| | | | |
|---|---|---|---|
| CN | 106951903 A | 7/2017 | |
| CN | 107016126 A | 8/2017 | |
| CN | 108122012 A | 6/2018 | |
| CN | 108168562 A | 6/2018 | |
| CN | 108256590 A | 7/2018 | |
| CN | 108804619 A | 11/2018 | |
| CN | 109068374 A | 12/2018 | |
| CN | 109195219 A | 1/2019 | |
| CN | 109635208 A | 4/2019 | |
| CN | 110096526 A | 8/2019 | |
| CN | 110647675 A | 1/2020 | |
| CN | 110677815 A | 1/2020 | |

OTHER PUBLICATIONS

Second Office Action and Supplementary Search Report from CN app. No. 201910725243.4, dated Mar. 24, 2021, with English translation from Global Dossier.

Non-Final Office Action from U.S. Appl. No. 16/821,729, dated Oct. 23, 2020.

Final Office Action from U.S. Appl. No. 16/821,729, dated Feb. 9, 2021.

Advisory Action from U.S. Appl. No. 16/821,729, dated May 3, 2021.

Non-Final Office Action from U.S. Appl. No. 16/821,729, dated Jun. 10, 2021.

First Office Action and Search report from CN app. No. 201910725078.2, dated Nov. 12, 2021, with English translation from Global Dossier, all pages.

Feng et al., "Design and Implementation of Indoor Poit of Interest Recommended System Based on Muliti-mode", Computer Engineering, Dec. 3, 2014, pp. 273-278.

\* cited by examiner

METHOD, APPARATUS AND STORAGE MEDIUM FOR STAY POINT RECOGNITION AND PREDICTION MODEL TRAINING

CROSS REFERENCE TO RELATED APPLICATIONS

The present application claims the priority of Chinese Patent Application No. 201910725078.2, filed on Aug. 7, 2019. The disclosure of the above application is incorporated herein by reference in its entirety.

TECHNICAL FIELD

The present disclosure relates to computer application technologies, and particularly to a method, an apparatus and a storage medium for stay point recognition and prediction model training.

BACKGROUND

In practical application, video, feed stream or the like may be pushed to a user based on the user's behavior patterns. The user's behavior patterns may be classified into two types: stay and move. Different behavior patterns may correspond to different push policies.

Correspondingly, the user's positioning point needs to be recognized to figure out whether the positioning point is a stay point or a moving point. At present, the following stay point recognition manners are usually employed: 1) a spatiotemporal window manner: this algorithm assumes that the user's positioning points are continuous trajectory points, and judges a point meeting specific temporal and spatial threshold conditions as the stay point; 2) a stay point recognition manner based on a wireless-fidelity (WiFi) connection, i.e., if it is determined that the user is connected with the WiFi of a fixed Point Of Interest (POI) at the positioning point, the positioning point may be believed as a stay point.

However, the above two manners both have certain problems in the practical application, for example, the manner 1) can handle situations about the continuity and density of the trajectory points well, but cannot handle other situations well, and exhibits an undesirable accuracy and recall rate; in the manner 2), although the positioning point connected with the WiFi of the fixed POI is usually the stay point, the stay point is not necessarily connected to the WiFi of the fixed POI. For example, when the user is within a scenic spot without the coverage of the WiFi, the stay point cannot be recognized in this manner, so the recall rate of this manner is lower.

SUMMARY

In view of the above, the present disclosure proposes a method, an apparatus and a storage medium for stay point recognition and prediction model training.

According to an embodiment of the present disclosure, a method for stay point recognition is proposed, and the method includes:

for a to-be-recognized positioning point, obtaining respectively features of N predetermined dimensions for the to-be-recognized positioning point, N being a positive integer greater than one;

generating a feature vector for the to-be-recognized positioning point according to the features of N predetermined dimensions;

determining whether the to-be-recognized positioning point is a stay point based on the feature vector, by using a prediction model obtained by pre-training.

According to an embodiment of the present disclosure, the features of N predetermined dimensions may include: a user feature of a user corresponding to the to-be-positioned positioning point, a contextual feature of the to-be-recognized positioning point, and a spatial feature of the to-be-recognized positioning point.

According to an embodiment of the present disclosure, the user feature may include any one of or any combination of the following: a user's identification, a user's resident address, and a user's commuter time;

the contextual feature of the to-be-recognized positioning point may include any one of or any combination of the following: whether the to-be-recognized positioning point is connected to a wireless fidelity WiFi, a POI type corresponding to the connected WiFi, a spatial distance and a temporal distance between a previous positioning point and the to-be-recognized positioning point, a spatial distance and a temporal distance between next positioning point and the to-be-recognized positioning point, positioning time features of the to-be-recognized positioning point, and positioning location features of the to-be-recognized positioning point; where the previous positioning point is a previous positioning point of the user corresponding to the to-be-recognized positioning point, and the next positioning point is next positioning point of the user corresponding to the to-be-recognized positioning point;

the spatial feature of the to-be-recognized positioning point may include any one of or any combination of the following: a proportion of historical stay points to historical movement points of a street block where the to-be-recognized positioning point lies, whether the to-be-recognized positioning point is located in an area of interest having a stay attribute, and a point of interest feature within a predetermined range around the to-be-recognized positioning point.

According to an embodiment of the present disclosure, the prediction model is obtained by:

constructing training data, each piece of training data corresponding to a positioning point, and each piece of training data may include: a feature vector for the positioning point, and a tag about whether the positioning point is a stay point; wherein the feature vector is generated according to obtained features of N predetermined dimensions for the positioning point, N being a positive integer greater than one;

obtaining the prediction model by training according to the training data constructed.

According to an embodiment of the present disclosure, a method for training a prediction model is proposed, and the method includes:

constructing training data, each piece of training data corresponding to a positioning point, and each piece of training data including: a feature vector for the positioning point, and a tag about whether the positioning point is a stay point; wherein the feature vector is generated according to obtained features of N predetermined dimensions for the positioning point, N being a positive integer greater than one;

obtaining the prediction model by training according to the training data constructed, so that for a to-be-recognized positioning point, determining whether the to-be-recognized positioning point is a stay point, based on a feature vector for the to-be-recognized positioning point.

According to an embodiment of the present disclosure, the features of N predetermined dimensions may include: a user feature of a user corresponding to the positioning point, a contextual feature of the positioning point, and a spatial feature of the positioning point.

According to an embodiment of the present disclosure, an apparatus for stay point recognition is proposed, and the apparatus includes: an obtaining unit, a generation unit and a recognition unit;

the obtaining unit is configured to, for a to-be-recognized positioning point, obtain respectively features of N predetermined dimensions for the to-be-recognized positioning point, N being a positive integer greater than one;

the generation unit is configured to generate a feature vector for the to-be-recognized positioning point according to the features of N predetermined dimensions;

the recognition unit is configured to determine whether the to-be-recognized positioning point is a stay point based on the feature vector, by using a prediction model obtained by pre-training.

According to an embodiment of the present disclosure, the features of N predetermined dimensions may include: a user feature of a user corresponding to the to-be-positioned positioning point, a contextual feature of the to-be-recognized positioning point, and a spatial feature of the to-be-recognized positioning point.

According to an embodiment of the present disclosure, the user feature may include any one of or any combination of the following: a user's identification, a user's resident address, and a user's commuter time;

the contextual feature of the to-be-recognized positioning point may include any one of or any combination of the following: whether the to-be-recognized positioning point is connected to a wireless fidelity WiFi, a POI type corresponding to the connected WiFi, a spatial distance and a temporal distance between a previous positioning point and the to-be-recognized positioning point, a spatial distance and a temporal distance between next positioning point and the to-be-recognized positioning point, positioning time features of the to-be-recognized positioning point, and positioning location features of the to-be-recognized positioning point; where the previous positioning point is a previous positioning point of the user corresponding to the to-be-recognized positioning point, and the next positioning point is next positioning point of the user corresponding to the to-be-recognized positioning point;

the spatial feature of the to-be-recognized positioning point may include any one of or any combination of the following: a proportion of historical stay points to historical movement points of a street block where the to-be-recognized positioning point lies, whether the to-be-recognized positioning point is located in an area of interest having a stay attribute, and a point of interest feature within a predetermined range around the to-be-recognized positioning point.

According to an embodiment of the present disclosure, the apparatus further includes: a pre-processing unit;

the pre-processing unit is configured to construct training data, each piece of training data corresponding to a positioning point, and each piece of training data may include: a feature vector for the positioning point, and a tag about whether the positioning point is a stay point; and the feature vector is generated according to obtained features of N predetermined dimensions for the positioning point, N being a positive integer greater than one; and to obtain the prediction model by training according to the training data constructed.

According to an embodiment of the present disclosure, an apparatus for training a prediction model is proposed, and the apparatus includes a constructing unit and a training unit;

the constructing unit is configured to construct training data, each piece of training data corresponding to a positioning point, and each piece of training data includes: a feature vector for the positioning point, and a tag about whether the positioning point is a stay point; wherein the feature vector is generated according to obtained features of N predetermined dimensions for the corresponding positioning point, N being a positive integer greater than one;

the training unit is configured to obtain the prediction model by training according to the training data constructed, so that for a to-be-recognized positioning point, determine whether the to-be-recognized positioning point is a stay point, based on a feature vector for the to-be-recognized positioning point.

According to an embodiment of the present disclosure, the features of N predetermined dimensions may include: a user feature of a user corresponding to the positioning point, a contextual feature of the positioning point, and a spatial feature of the positioning point.

According to an embodiment of the present disclosure, a computer device is proposed, and the computer device includes a memory, a processor and a computer program which is stored on the memory and runs on the processor, the processor, upon executing the program, implementing the above-mentioned method.

According to an embodiment of the present disclosure, a computer-readable storage medium on which a computer program is stored, the program, when executed by the processor, implementing the aforesaid method, is proposed.

As may be seen from the above introduction, according to technical solutions of the present disclosure, the prediction model may be obtained by pre-training; when stay point recognition needs to be performed, it is possible to, for the to-be-positioned positioning point, obtain respectively features of a plurality of predetermined dimensions, generate a feature vector according to the features obtained, and thereby use the prediction model to determine whether the to-be-recognized positioning point is the stay point based on the feature vector generated. The manner as stated in the present disclosure may be adapted for various situations, thereby improving a recall rate of the stay point and having a higher accuracy.

DETAILED DESCRIPTION OF EMBODIMENTS

Technical solutions of the present disclosure will be described in more detail in conjunction with figures and embodiments to make technical solutions of the present disclosure clear and more apparent.

It is to be noted that, the embodiments described here are partial embodiments of the present disclosure, not all embodiments. Based on embodiments in the present disclosure, all other embodiments obtained by those having ordinary skill in the art without making inventive efforts all fall within the protection scope of the present disclosure.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
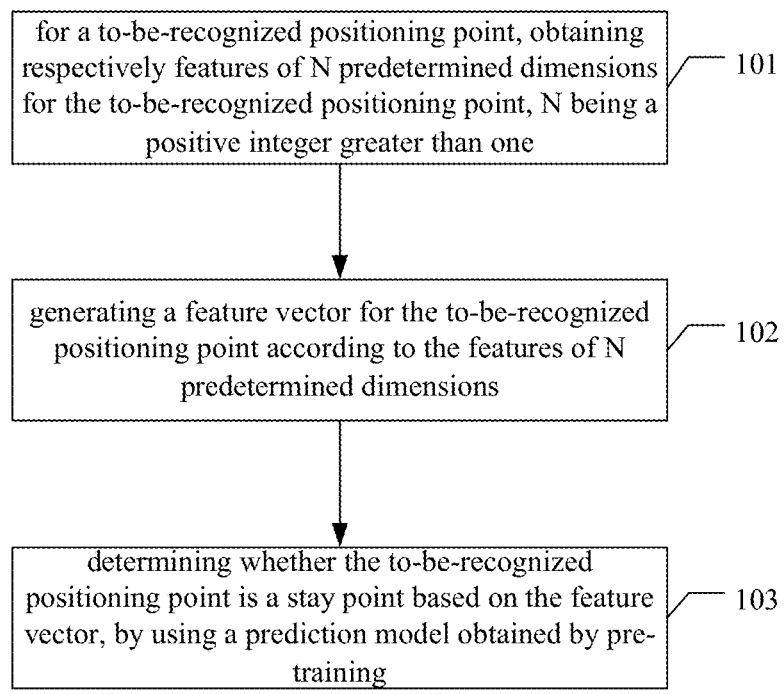
FIG. 1 is a flow chart of a method for stay point recognition according to an embodiment of the present disclosure.

FIG. 1 is a flow chart of a method for stay point recognition according to an embodiment of the present disclosure. As shown in FIG. 1, the method in the embodiment may include the following steps.

At 101, for a to-be-recognized positioning point, features of N predetermined dimensions for the to-be-recognized positioning point are obtained respectively, N being a positive integer greater than one.

At 102, a feature vector for the to-be-recognized positioning point is generated according to the features of N predetermined dimensions.

At 103, whether the to-be-recognized positioning point is a stay point is determined based on the feature vector generated, by using a prediction model obtained by pre-training.

A value of N may be decided according to actual requirement. In an embodiment, the features of N predetermined dimensions may include: a user feature of a user corresponding to the to-be-positioned positioning point, a contextual feature of the to-be-recognized positioning point, and a spatial feature of the to-be-recognized positioning point.

The features in the above three dimensions are described in detail respectively.

1) The User Feature of a User Corresponding to the To-Be-Positioned Positioning Point The user feature may include but is not limited to any one of or any combination of the following: a user's identification, a user's resident address, and a user's commuter time.

For the to-be-recognized positioning point, it is possible to obtain information such as the user's identification, positioning time and positioning location of the positioning point and the connected WiFi, and extract user identification information from the information.

The user's resident address may include resident city, resident district or county, resident street block and so on, and may be obtained by performing statistics and analysis for the user's historical behavior data in a conventional manner.

The user's commuter time may be represented with a time range, for example, the time for go to work is 7:00-8:00 am. The feature may also be obtained by performing statistics and analysis for the user's historical behavior data.

2) The Contextual Feature of the To-Be-Recognized Positioning Point

The contextual feature of the to-be-recognized positioning point may include but is not limited to any one of or any combination of the following: whether the to-be-recognized positioning point is connected to the WiFi, a POI type corresponding to the connected WiFi, a spatial distance and a temporal distance between a previous positioning point and the to-be-recognized positioning point, a spatial distance and a temporal distance between next positioning point and the to-be-recognized positioning point, positioning time features of the to-be-recognized positioning point, and positioning location features of the to-be-recognized positioning point; here the previous positioning point is the previous positioning point of the user corresponding to the to-be-recognized positioning point, and the next positioning point is next positioning point of the user corresponding to the to-be-recognized positioning point.

As stated above, for a to-be-recognized positioning point, it is possible to obtain information such as the user's identification, positioning time and positioning location of the positioning point and the WiFi to which the positioning point is connected, and correspondingly possible to know whether the to-be-recognized positioning point is connected to the WiFi, and the POI type corresponding to the connected WiFi, for example, a stationary POI such as a hotel or a movable POI such as a bus.

The technical solution of this embodiment may be applied to an offline processing scenario or an online real-time processing scenario. For the offline processing scenario, it is possible to simultaneously obtain the previous positioning point and next positioning point of the to-be-recognized positioning point, and these positioning points correspond to the same user. For the online real-time processing scenario, it is only possible to obtain the previous positioning point of the to-be-recognized positioning point, and impossible to obtain the next positioning point of the to-be-recognized positioning point. If only the previous positioning point is obtained, the spatial distance and temporal distance between the previous positioning point and the to-be-recognized positioning point may be obtained. If both the previous positioning point and the next positioning point are obtained, it is possible to obtain the spatial distance and temporal distance between the previous positioning point and the to-be-recognized positioning point and the spatial distance and temporal distance between the next positioning point and the to-be-recognized positioning point.

The positioning time feature of the to-be-recognized positioning point may include which hour the user is in, whether the user is in a rush hour, whether the current day is a holiday, and the like.

The positioning location feature of the to-be-recognized positioning point may include a city, district or county, street block and so on where the positioning location lies.

3) The Spatial Feature of the To-Be-Recognized Positioning Point

The spatial feature of the to-be-recognized positioning point may include but is not limited to any one of or any combination of the following: a proportion of historical stay points to historical movement points of the street block where the to-be-recognized positioning point lies, whether the to-be-recognized positioning point is located in an Area of Interest (AOI) having a stay attribute, and the POI features within a predetermined range around the to-be-recognized positioning point.

The proportion of historical stay points to historical movement points of the street block where the to-be-recognized positioning point lies may refer to a proportion of positioning points as the stay points to positioning points as movement points, in the obtained users' historical positioning points of a known type within the latest predetermined time period. The historical positioning points of a known type may refer to the historical positioning points which are determined as stay points or movement points in a certain manner or by a certain rule.

The AOI may be referred to as information area and refers to area-shaped geographical entities in map data. For example, POIs such as the Summer Palace, the Forbidden City and the like each has an AOI, and the AOI has a stay attribute, and on the contrary, for example Beijing-Xinjiang Freeway does not have a stay attribute. Whether the to-be-recognized positioning point is located in the AOI having a stay attribute means whether the to-be-recognized positioning point is located within a range of a certain AOI having a stay attribute.

The POI features within a predetermined range around the to-be-recognized positioning point may include the number of POIs within the predetermined range around the to-be-recognized positioning point, types of the POIs, and so on. The predetermined range around the to-be-recognized positioning point may refer to a range within 100 meters around the to-be-recognized positioning point.

The above features are only for exemplary illustration purpose and not intended to limit the technical solution of the present disclosure. In practical application, which features of the to-be-recognized positioning point are specifically obtained depends on actual needs.

After the features for the to-be-recognized positioning point are obtained, a feature vector for the to-be-recognized positioning point may be further generated according to the features obtained.

How to generate the feature vector according to the features is not limited. For example, it is possible to map each feature to a value according to a predetermined rule/manner as an element in the feature vectors, or to map each feature to a feature vector according to a predetermined rule/manner, and then connect the feature vectors end to end to obtain a finally-needed feature vector.

Then, a prediction model obtained by pre-training may be used to determine whether the to-be-recognized positioning point is a stay point based on the feature vector for the to-be-recognized positioning point. That is, it is possible to input the feature vector for the to-be-recognized positioning point into the prediction model to thereby obtain a judgment result about whether what is output by the prediction model is a stay point.

The specific type of the prediction model is not limited herein. The prediction model may be any machine learning model, for example, a neural network model, a decision tree model, a logistic regression model, a Support Vector Machine (SVM) model, a Gradient Boosting Decision Tree (GBDT) model, etc.

The prediction model may be obtained by pre-training. The training process of the prediction model will be described below.

Figure 2:
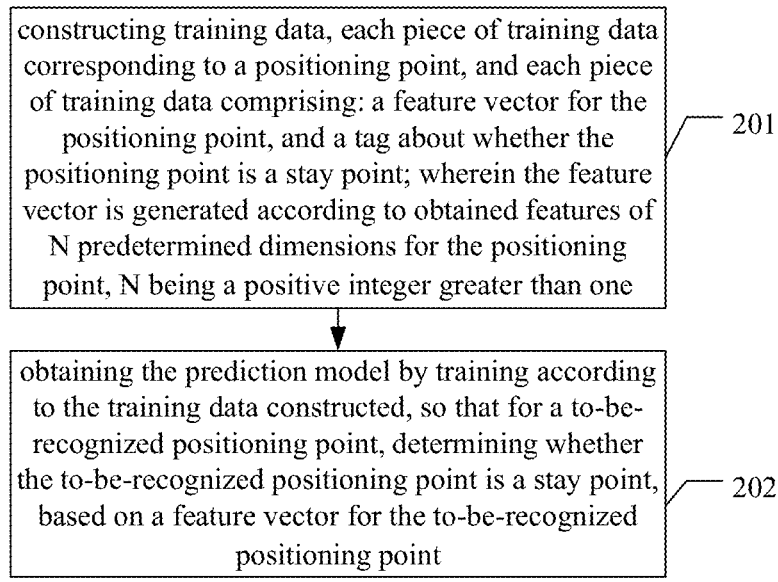
FIG. 2 is a flow chart of a method for training a prediction model according to an embodiment of the present disclosure.

FIG. 2 is a flow chart of a method for training a prediction model according to an embodiment of the present disclosure. As shown in FIG. 2, the method may include the following steps.

At 201, training data is constructed, each piece of training data corresponds to a positioning point, and each piece of training data includes: a feature vector for the positioning point, and a tag about whether the positioning point is a stay point; wherein the feature vector is generated according to obtained features of N predetermined dimensions for the positioning point, N being a positive integer greater than one.

At 202, the prediction model is obtained by training according to the training data constructed, so that for a to-be-recognized positioning point, determine whether the to-be-recognized positioning point is a stay point, based on a feature vector for the to-be-recognized positioning point.

The positioning point corresponding to the training data may be a positioning point which may be determined as a stay point or a moving point in a certain manner or by a certain rule. For example, whether the positioning point is the stay point or moving point is manually marked. Alternatively, a stay state of the positioning point may also be determined according to obvious features of the user's stay or movement.

For example, as for a certain user's historical positioning point, if the user accesses the WiFi of a fixed POI at the positioning point, the positioning point may be determined as a stay point. For another example, as for a certain user's historical positioning point, if it is known in a certain way that the time period while the user is located at the positioning point is greater than 30 minutes, the positioning point may be determined as a stay point. For still another example, as for a certain user's historical positioning point, if it is known in a certain way that the user conducts a consuming behavior at the positioning point, the positioning point may be determined as a stay point. For still another example, if the positioning point is obtained during a certain user's navigation, the positioning point may be determined as a moving point.

For the positioning point corresponding to each piece of training data, its features of N predetermined dimensions may be obtained respectively, and a specific value of N depends on actual needs. In an embodiment, the features of N predetermined dimensions may include: a user feature of a user corresponding to the positioning point, a contextual feature of the positioning point, and a spatial feature of the positioning point. Reference may be made to relevant depictions in the embodiment shown in FIG. 1 for features specifically included by the features in each dimension, and detailed depictions are not presented any more.

After the features of the positioning point corresponding to each piece of training data are obtained, a feature vector for the positioning point may be further generated according to the features obtained. How to generate the feature vector according to the features is not limited herein.

It is possible to further train according to the training data constructed to obtain a prediction model. As such, when the prediction model needs to be used subsequently for stay point recognition, it is feasible to, for a to-be-recognized positioning point, determine whether the to-be-recognized positioning point is a stay point, based on a feature vector for the to-be-recognized positioning point.

The prediction model may be any machine learning model, for example, a neural network model, a decision tree model, a logistic regression model, a support vector machine model, a gradient boosting decision tree model, etc.

It is to be noted that, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description are merely exemplary embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

To sum up, according to the technical solution of the above method embodiment, the prediction model may be obtained by pre-training; when stay point recognition needs to be performed, it is possible to, for the to-be-positioned positioning point, obtain respectively its features of a plurality of predetermined dimensions, generate a feature vector according to the features obtained, and thereby use the prediction model to determine whether the to-be-recognized positioning point is a stay point based on the feature vector generated. The manner as stated in the present disclosure may be adapted for various situations, thereby improving the recall rate of the stay point and having a higher accuracy. Furthermore, upon obtaining the features of the positioning point, the above manner gives sufficient thoughts to various dimensional features such as the user feature, the contextual feature and spatial feature of the positioning point, thereby further improving the accuracy of the recognition result.

The above introduces the method embodiments. The solution of the present disclosure will be further described through an apparatus embodiment.

Figure 3:
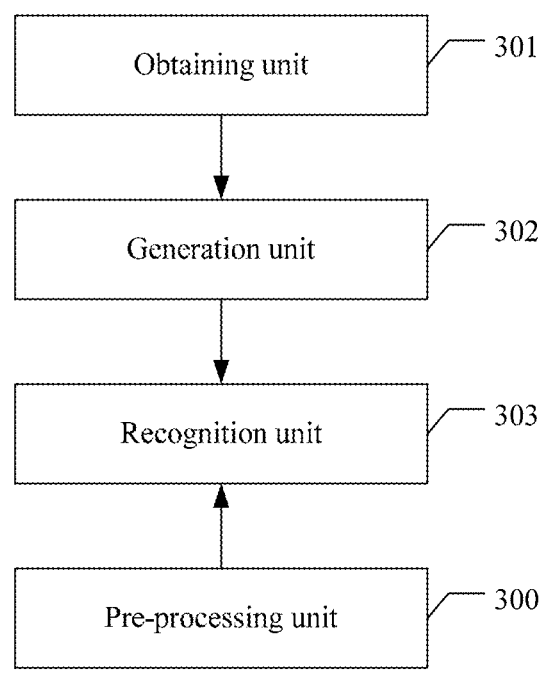
FIG. 3 is a block diagram of an apparatus for stay point recognition according to an embodiment of the present disclosure.

FIG. 3 is a block diagram of an apparatus for stay point recognition according to an embodiment of the present disclosure. As shown in FIG. 3, the apparatus include: an obtaining unit 301, a generation unit 302 and a recognition unit 303.

The obtaining unit 301 is configured to, for a to-be-recognized positioning point, obtain respectively features of N predetermined dimensions for the to-be-recognized positioning point , N being a positive integer greater than one.

The generation unit 302 is configured to generate a feature vector for the to-be-recognized positioning point according to the features of N predetermined dimensions.

The recognition unit 303 is configured to determine whether the to-be-recognized positioning point is a stay point based on the feature vector generated, by using a prediction model obtained by pre-training.

A specific value of N depends on actual needs. In an embodiment, the features of N predetermined dimensions may include: a user feature of a user corresponding to the to-be-positioned positioning point, a contextual feature of the to-be-recognized positioning point, and a spatial feature of the to-be-recognized positioning point.

The user feature may include but is not limited to any one of or any combination of the following: a user's identification, a user's resident address, and a user's commuter time.

The contextual feature of the to-be-recognized positioning point may include but is not limited to any one of or any combination of the following: whether the to-be-recognized positioning point is connected to the WiFi, a POI type corresponding to the connected WiFi, a spatial distance and a temporal distance between a previous positioning point and the to-be-recognized positioning point, a spatial distance and a temporal distance between next positioning point and the to-be-recognized positioning point, a positioning time feature of the to-be-recognized positioning point, and a positioning location feature of the to-be-recognized positioning point; here the previous positioning point is the previous positioning point of the user corresponding to the to-be-recognized positioning point, and the next positioning point is next positioning point of the user corresponding to the to-be-recognized positioning point.

The spatial feature of the to-be-recognized positioning point may include but is not limited to any one of or any combination of the following: a proportion of historical stay points to historical movement points of the street block where the to-be-recognized positioning point lies, whether the to-be-recognized positioning point is located in an Area of Interest (AOI) having a stay attribute, and POI features within a predetermined range around the to-be-recognized positioning point.

The generation unit 302 may generate the feature vector for the to-be-recognized positioning point according to the features obtained. How to generate the feature vector according to the feature is not limited herein.

Then, the recognition unit 303 may use a prediction model obtained by pre-training to determine whether the to-be-recognized positioning point is a stay point based on the feature vector generated, namely, input the feature vector for the to-be-recognized positioning point into the prediction model to thereby obtain a judgment result about whether what is output by the prediction model is a stay point.

Correspondingly, the apparatus shown in FIG. 3 may further include: a pre-processing unit 300 configured to construct training data, each piece of training data corresponding to a positioning point, and each piece of training data including: a feature vector for the positioning point, and a tag about whether the positioning point is a stay point; here the feature vector is generated according to obtained features of N predetermined dimensions for the positioning point, N being a positive integer greater than one; obtain the prediction model by training according to the training data constructed.

Figure 4:
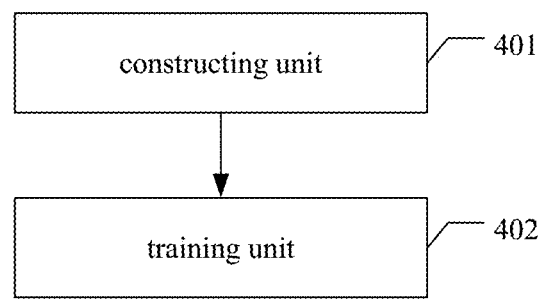
FIG. 4 is a block diagram of an apparatus for training prediction model according to an embodiment of the present disclosure.

FIG. 4 is a block diagram of an apparatus for training a prediction model according to an embodiment of the present disclosure. As shown in FIG. 4, the apparatus includes a constructing unit 401 and a training unit 402.

The constructing unit 401 is configured to construct training data, each piece of training data corresponding to a positioning point, and each piece of training data including: a feature vector for the positioning point, and a tag about whether the positioning point is a stay point; here the feature vector is generated according to obtained features of N predetermined dimensions for the positioning point, N being a positive integer greater than one.

The training unit 402 is configured to obtain the prediction model by training according to the training data constructed, so that for a to-be-recognized positioning point, determine whether the to-be-recognized positioning point is a stay point, based on a feature vector for the to-be-recognized positioning point.

The positioning point corresponding to the training data may be a positioning point which may be determined as a stay point or a moving point in a certain manner or by a certain rule. For example, whether the positioning point is the stay point or moving point is manually marked. Alternatively, a stay state of the positioning point may also be determined according to obvious features of the user's stay or movement.

For the positioning point corresponding to each piece of training data, the constructing unit 401 may obtain respectively its features of N predetermined dimensions, a specific value of N depending on actual needs. In an embodiment, the features of N predetermined dimensions may include: a user feature of a user corresponding to the positioning point, a contextual feature of the positioning point, and a spatial feature of the positioning point.

After obtaining the features for the positioning point corresponding to each piece of training data, the constructing unit 401 may further generate a feature vector for the positioning point according to the features obtained. How to generate the feature vector according to the features is not limited herein.

The training unit 402 may train to obtain the prediction model according to the training data constructed. As such, when the prediction model needs to be used subsequently for stay point recognition, it is feasible to, for a to-be-recognized positioning point, determine whether the to-be-recognized positioning point is a stay point, based on a feature vector for the to-be-recognized positioning point.

The prediction model may be any machine learning model, for example, a neural network model, a decision tree model, a logistic regression model, a support vector machine model, a gradient boosting decision tree model, etc.

A specific workflow of the apparatus embodiment shown in FIG. 3 and FIG. 4 will not be detailed any more here, and reference may be made to corresponding depictions in the above method embodiment.

Figure 5:
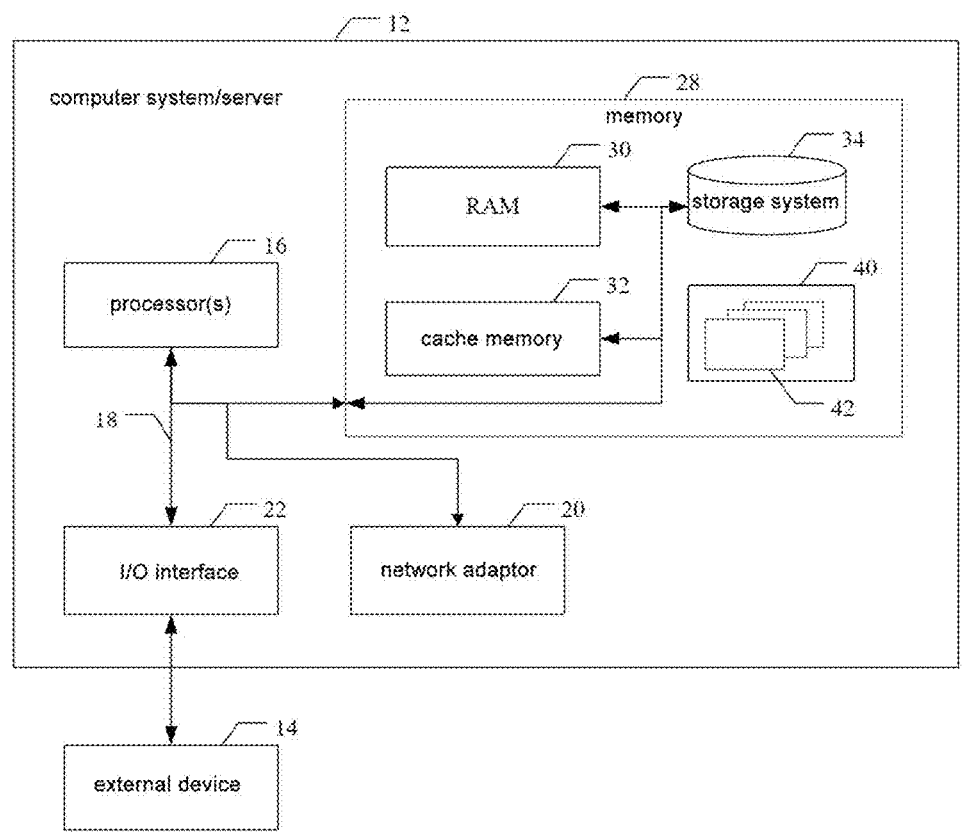
FIG. 5 illustrates a block diagram of an example computer system/server 12 for implementing an implementation mode of the present disclosure.

FIG. 5 illustrates a block diagram of an example computer system/server 12 adapted to implement an implementation mode of the present disclosure. The computer system/server 12 shown in FIG. 5 is only an example and should not bring about any limitation to the function and scope of use of the embodiments of the present disclosure.

As shown in FIG. 5, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 5, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1 or FIG. 2.

The present disclosure meanwhile provides a computer-readable storage medium on which a computer program is stored, the program, when executed by the processor, implementing the method stated in the embodiment shown in FIG. 1 or FIG. 2.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for stay point recognition, wherein the method comprises:
   for a to-be-recognized positioning point, obtaining respectively features of N predetermined dimensions for the to-be-recognized positioning point, N being a positive integer greater than one;
   generating a feature vector for the to-be-recognized positioning point according to the features of N predetermined dimensions; and
   determining whether the to-be-recognized positioning point is a stay point based on the feature vector, by using a prediction model obtained by pre-training.

2. The method according to claim 1, wherein the features of N predetermined dimensions comprises: a user feature of a user corresponding to the to-be-positioned positioning point, a contextual feature of the to-be-recognized positioning point, and a spatial feature of the to-be-recognized positioning point.

3. The method according to claim 2, wherein the user feature comprises any one of or any combination of the following: a user's identification, a user's resident address, and a user's commuter time;
   the contextual feature of the to-be-recognized positioning point comprise any one of or any combination of the following: whether the to-be-recognized positioning point is connected to a wireless fidelity WiFi, a POI type corresponding to the connected WiFi, a spatial distance and a temporal distance between a previous positioning point and the to-be-recognized positioning point, a spatial distance and a temporal distance between next positioning point and the to-be-recognized positioning point, positioning time features of the to-be-recognized positioning point, and positioning location features of the to-be-recognized positioning point; wherein the previous positioning point is a previous positioning point of the user corresponding to the to-be-recognized positioning point, and the next positioning point is next positioning point of the user corresponding to the to-be-recognized positioning point; and
   the spatial feature of the to-be-recognized positioning point comprise any one of or any combination of the following: a proportion of historical stay points to historical movement points of a street block where the to-be-recognized positioning point lies, whether the to-be-recognized positioning point is located in an area of interest having a stay attribute, and a point of interest feature within a predetermined range around the to-be-recognized positioning point.

4. The method according to claim 1, wherein the prediction model is obtained by:
   constructing training data, each piece of training data corresponding to a positioning point, and each piece of training data comprising: a feature vector for the positioning point, and a tag about whether the positioning point is a stay point; wherein the feature vector is generated according to obtained features of N predetermined dimensions for the positioning point, N being a positive integer greater than one; and
   obtaining the prediction model by training according to the training data constructed.

5. A method for training a prediction model, wherein the method comprises:
   constructing training data, each piece of training data corresponding to a positioning point, and each piece of training data comprising: a feature vector for the positioning point, and a tag about whether the positioning point is a stay point; wherein the feature vector is generated according to obtained features of N predetermined dimensions for the positioning point, N being a positive integer greater than one; and
   obtaining the prediction model by training according to the training data constructed, so that for a to-be-recognized positioning point, determining whether the to-be-recognized positioning point is a stay point, based on a feature vector for the to-be-recognized positioning point.

6. The method according to claim 5, wherein the features of N predetermined dimensions comprise: a user feature of a user corresponding to the positioning point, a contextual feature of the positioning point, and a spatial feature of the positioning point.

7. A computer device, comprising a memory, a processor and a computer program which is stored on the memory and runs on the processor, wherein the processor, upon executing the program, implements a method for stay point recognition, wherein the method comprises:
    for a to-be-recognized positioning point, obtaining respectively features of N predetermined dimensions for the to-be-recognized positioning point, N being a positive integer greater than one;
    generating a feature vector for the to-be-recognized positioning point according to the features of N predetermined dimensions; and
    determining whether the to-be-recognized positioning point is a stay point based on the feature vector, by using a prediction model obtained by pre-training.

8. The computer device according to claim 7, wherein the features of N predetermined dimensions comprises: a user feature of a user corresponding to the to-be-positioned positioning point, a contextual feature of the to-be-recognized positioning point, and a spatial feature of the to-be-recognized positioning point.

9. The computer device according to claim 8, wherein the user feature comprises any one of or any combination of the following: a user's identification, a user's resident address, and a user's commuter time;
    the contextual feature of the to-be-recognized positioning point comprise any one of or any combination of the following: whether the to-be-recognized positioning point is connected to a wireless fidelity WiFi, a POI type corresponding to the connected WiFi, a spatial distance and a temporal distance between a previous positioning point and the to-be-recognized positioning point, a spatial distance and a temporal distance between next positioning point and the to-be-recognized positioning point, positioning time features of the to-be-recognized positioning point, and positioning location features of the to-be-recognized positioning point; wherein the previous positioning point is a previous positioning point of the user corresponding to the to-be-recognized positioning point, and the next positioning point is next positioning point of the user corresponding to the to-be-recognized positioning point; and
    the spatial feature of the to-be-recognized positioning point comprise any one of or any combination of the following: a proportion of historical stay points to historical movement points of a street block where the to-be-recognized positioning point lies, whether the to-be-recognized positioning point is located in an area of interest having a stay attribute, and a point of interest feature within a predetermined range around the to-be-recognized positioning point.

10. The computer device according to claim 7, wherein the prediction model is obtained by:
    constructing training data, each piece of training data corresponding to a positioning point, and each piece of training data comprising: a feature vector for the positioning point, and a tag about whether the positioning point is a stay point; wherein the feature vector is generated according to obtained features of N predetermined dimensions for the positioning point, N being a positive integer greater than one; and
    obtaining the prediction model by training according to the training data constructed.

11. A computer device, comprising a memory, a processor and a computer program which is stored on the memory and runs on the processor, wherein the processor, upon executing the program, implements a method for training a prediction model, wherein the method comprises:
    constructing training data, each piece of training data corresponding to a positioning point, and each piece of training data comprising: a feature vector for the positioning point, and a tag about whether the positioning point is a stay point; wherein the feature vector is generated according to obtained features of N predetermined dimensions for the positioning point, N being a positive integer greater than one; and
    obtaining the prediction model by training according to the training data constructed, so that for a to-be-recognized positioning point, determining whether the to-be-recognized positioning point is a stay point, based on a feature vector for the to-be-recognized positioning point.

12. The computer device according to claim 11, wherein the features of N predetermined dimensions comprise: a user feature of a user corresponding to the positioning point, a contextual feature of the positioning point, and a spatial feature of the positioning point.

13. A non-transitory computer-readable storage medium on which a computer program is stored, wherein the program, when executed by a processor, implements a method for stay point recognition, wherein the method comprises:
    for a to-be-recognized positioning point, obtaining respectively features of N predetermined dimensions for the to-be-recognized positioning point, N being a positive integer greater than one;
    generating a feature vector for the to-be-recognized positioning point according to the features of N predetermined dimensions; and
    determining whether the to-be-recognized positioning point is a stay point based on the feature vector, by using a prediction model obtained by pre-training.

14. The non-transitory computer-readable storage medium according to claim 13, wherein the features of N predetermined dimensions comprises: a user feature of a user corresponding to the to-be-positioned positioning point, a contextual feature of the to-be-recognized positioning point, and a spatial feature of the to-be-recognized positioning point.

15. The non-transitory computer-readable storage medium according to claim 14, wherein the user feature comprises any one of or any combination of the following: a user's identification, a user's resident address, and a user's commuter time;
    the contextual feature of the to-be-recognized positioning point comprise any one of or any combination of the following: whether the to-be-recognized positioning point is connected to a wireless fidelity WiFi, a POI type corresponding to the connected WiFi, a spatial distance and a temporal distance between a previous positioning point and the to-be-recognized positioning point, a spatial distance and a temporal distance between next positioning point and the to-be-recognized positioning point, positioning time features of the to-be-recognized positioning point, and positioning location features of the to-be-recognized positioning point; wherein the previous positioning point is a previous positioning point of the user corresponding to the to-be-recognized positioning point, and the next positioning point is next positioning point of the user corresponding to the to-be-recognized positioning point; and the spatial feature of the to-be-recognized positioning point comprise any one of or any combination of the following: a proportion of historical stay points to historical movement points of a street block where the to-be-recognized positioning point lies, whether the to-be-recognized positioning point is located in an area of interest having a stay attribute, and a point of interest feature within a predetermined range around the to-be-recognized positioning point.

16. The non-transitory computer-readable storage medium according to claim 13, wherein the prediction model is obtained by:

constructing training data, each piece of training data corresponding to a positioning point, and each piece of training data comprising: a feature vector for the positioning point, and a tag about whether the positioning point is a stay point;

wherein the feature vector is generated according to obtained features of N predetermined dimensions for the positioning point, N being a positive integer greater than one; and obtaining the prediction model by training according to the training data constructed.

17. A non-transitory computer-readable storage medium on which a computer program is stored, wherein the program, when executed by a processor, implements a method for training a prediction model, wherein the method comprises:

constructing training data, each piece of training data corresponding to a positioning point, and each piece of training data comprising: a feature vector for the positioning point, and a tag about whether the positioning point is a stay point; wherein the feature vector is generated according to obtained features of N predetermined dimensions for the positioning point, N being a positive integer greater than one; and obtaining the prediction model by training according to the training data constructed, so that for a to-be-recognized positioning point, determining whether the to-be-recognized positioning point is a stay point, based on a feature vector for the to-be-recognized positioning point.

18. The non-transitory computer-readable storage medium according to claim 17, wherein the features of N predetermined dimensions comprise: a user feature of a user corresponding to the positioning point, a contextual feature of the positioning point, and a spatial feature of the positioning point.

* * * * *